Nov. 29, 1955 G. C. PAXTON 2,724,833
LOCATOR AND LID CLOSING MECHANISM FOR BOX NAILING MACHINES
Filed Jan. 24, 1955 8 Sheets-Sheet 1

INVENTOR
G. C. Paxton
BY
ATTORNEYS

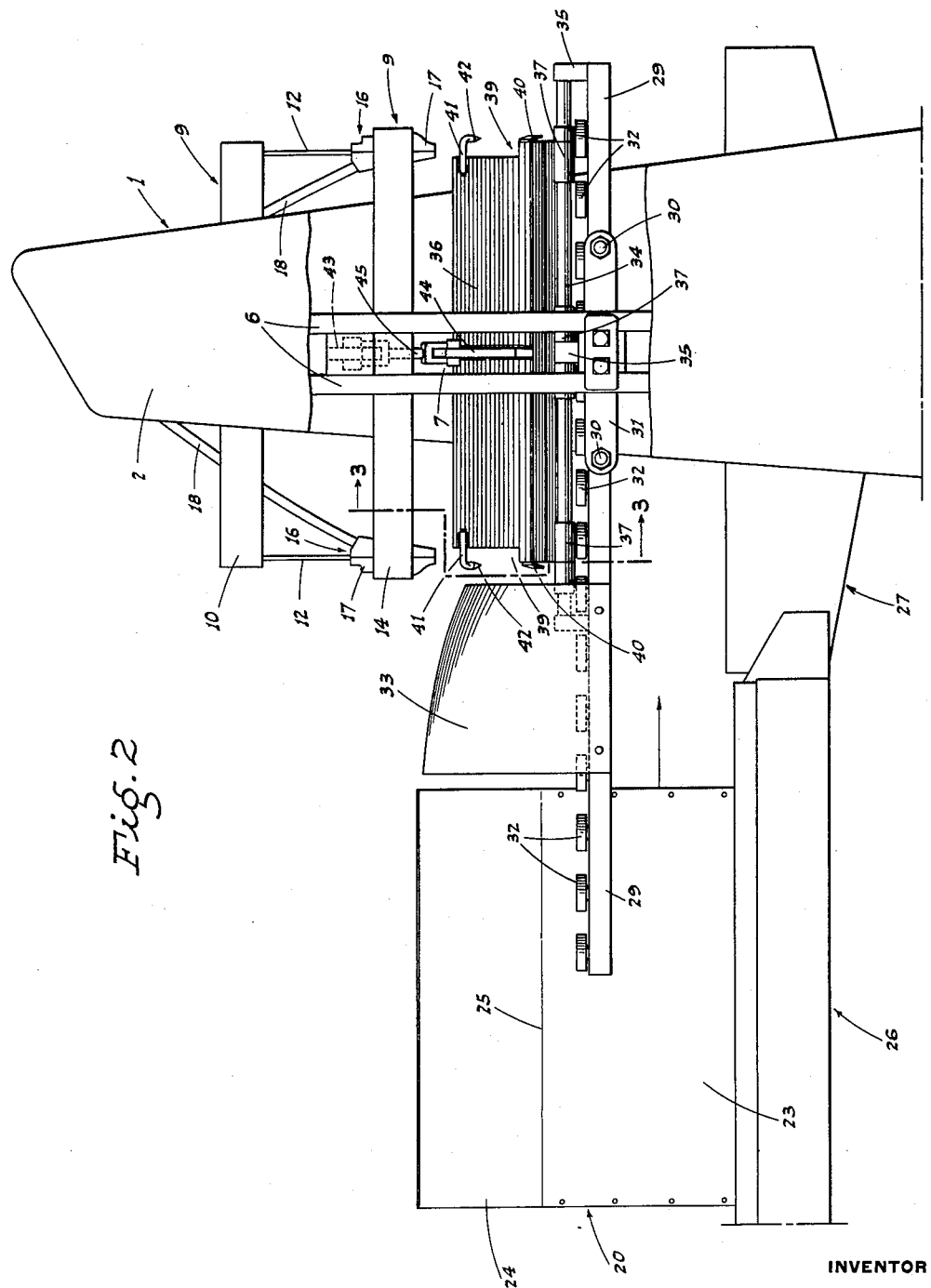

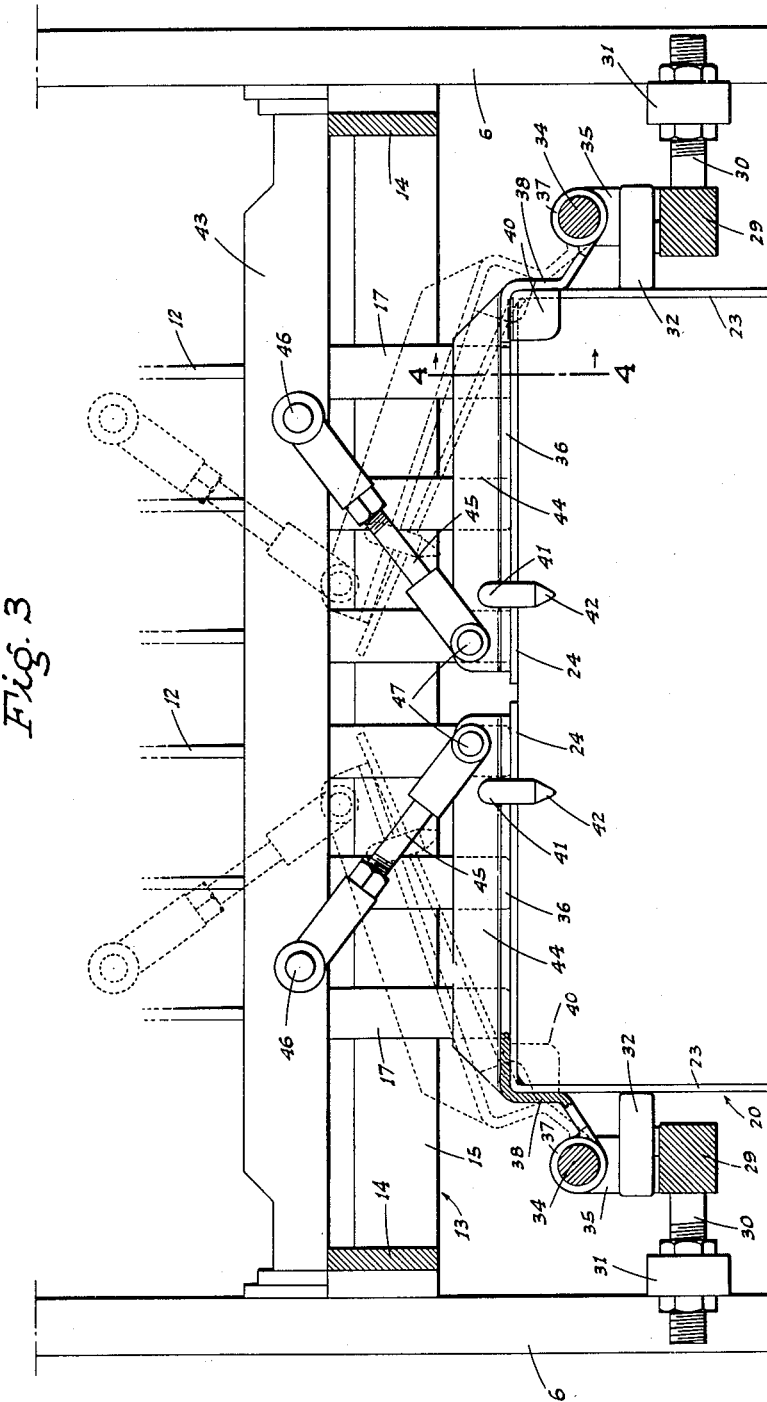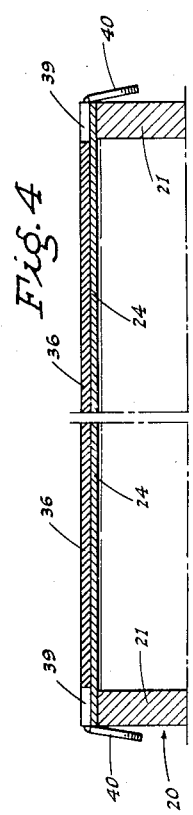

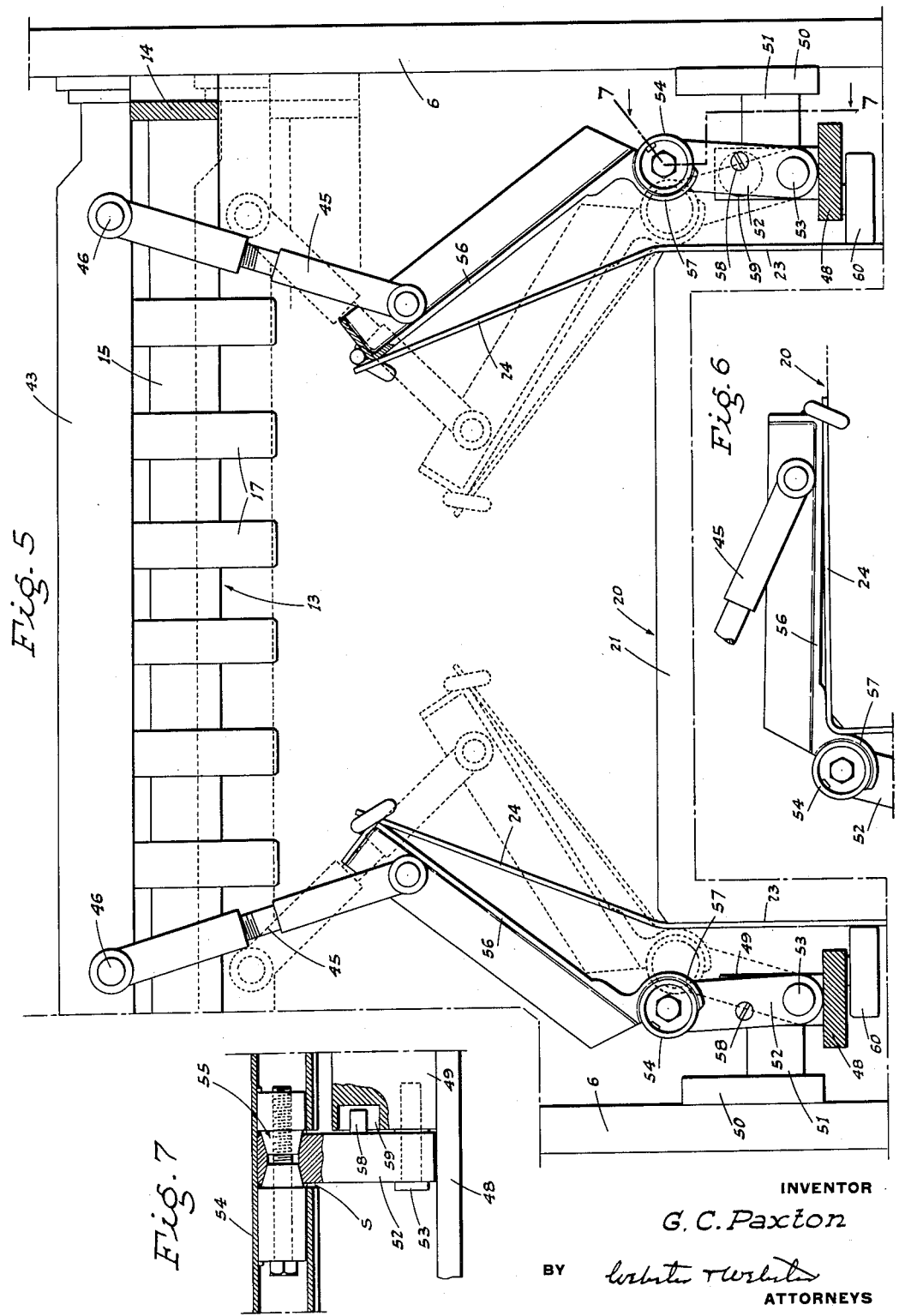

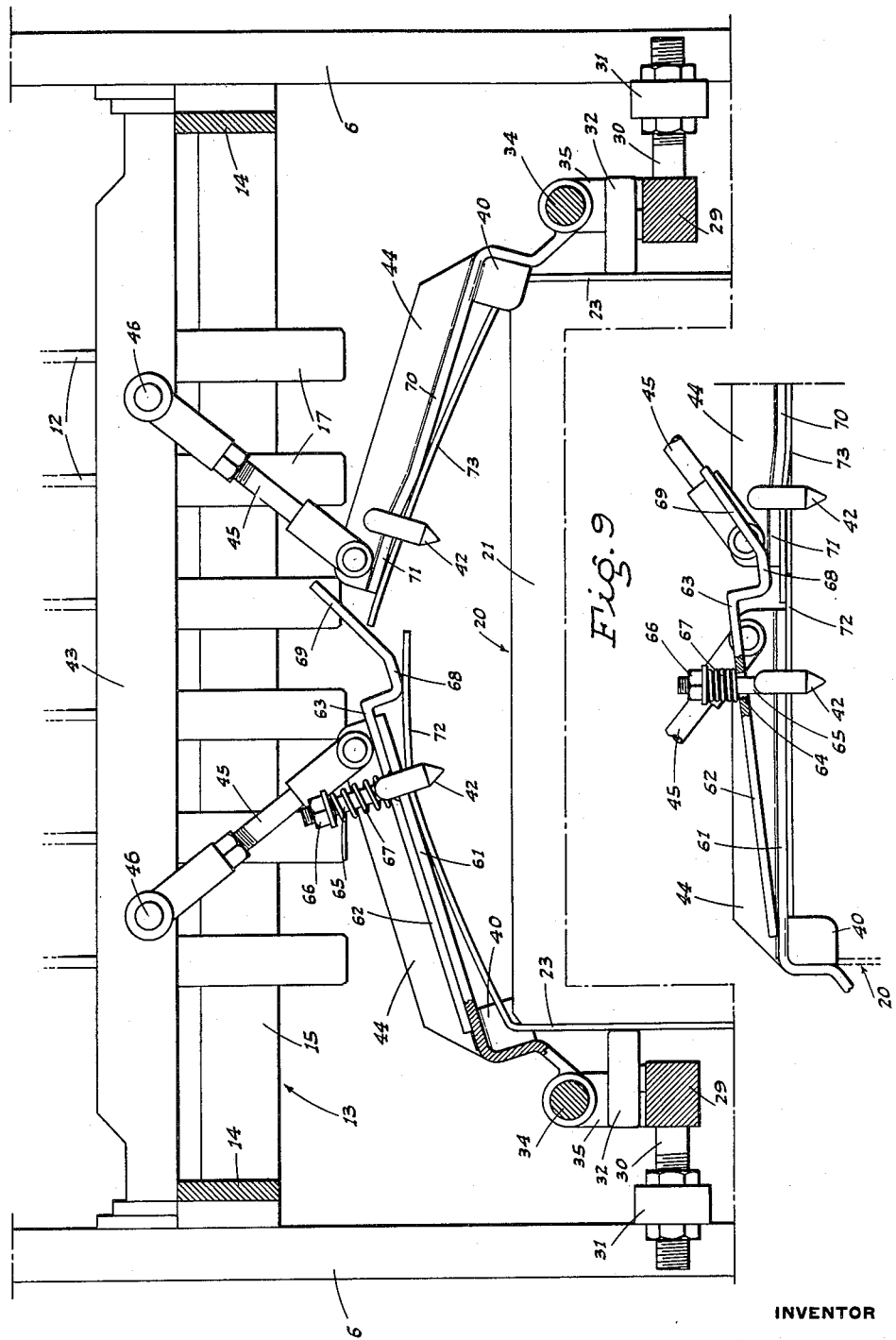

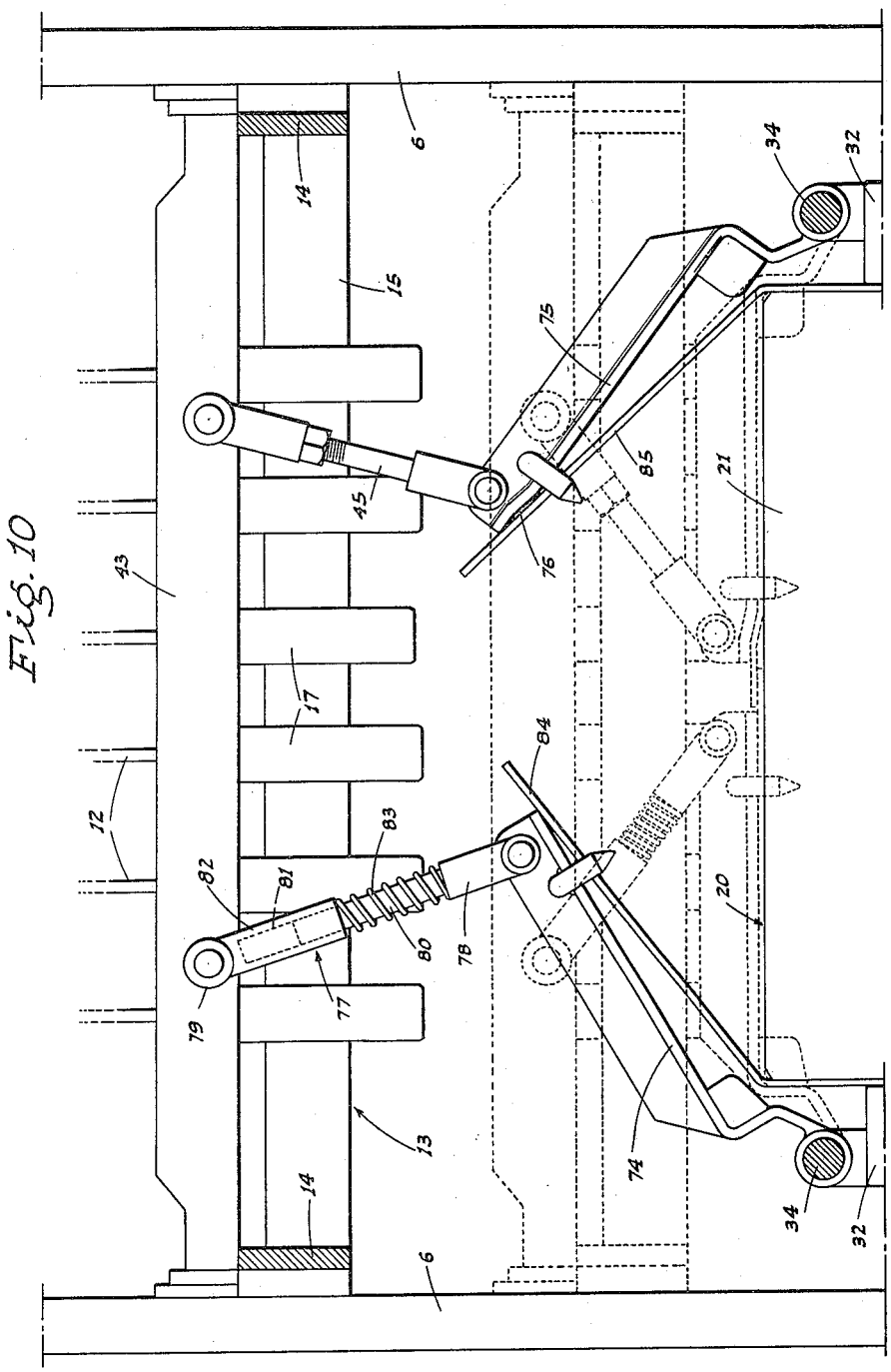

Nov. 29, 1955  G. C. PAXTON  2,724,833
LOCATOR AND LID CLOSING MECHANISM FOR BOX NAILING MACHINES
Filed Jan. 24, 1955  8 Sheets-Sheet 7

INVENTOR
G. C. Paxton
BY
ATTORNEYS

Nov. 29, 1955  G. C. PAXTON  2,724,833
LOCATOR AND LID CLOSING MECHANISM FOR BOX NAILING MACHINES
Filed Jan. 24, 1955  8 Sheets-Sheet 8
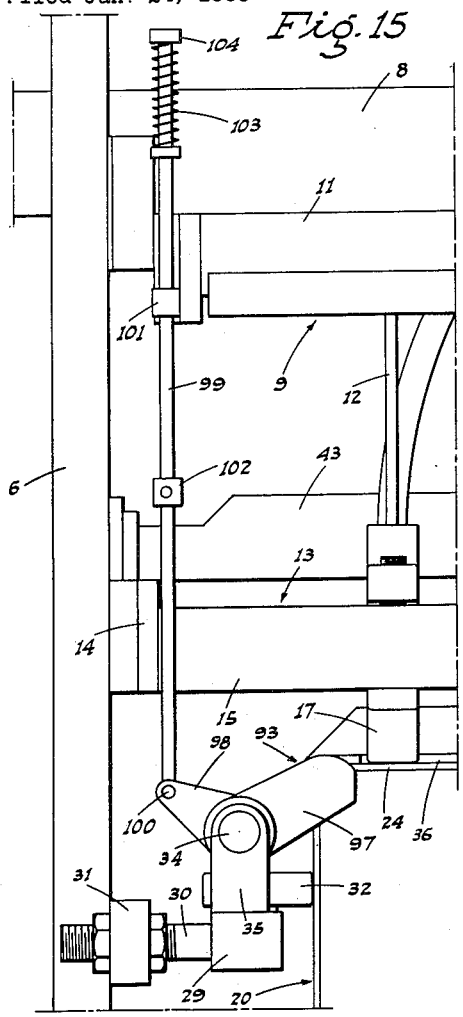
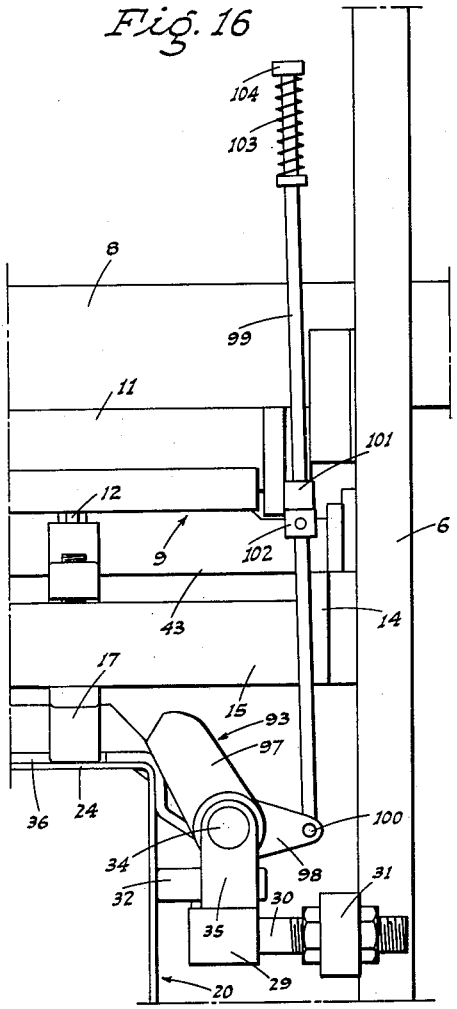
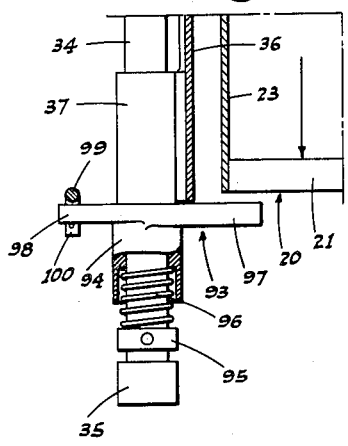
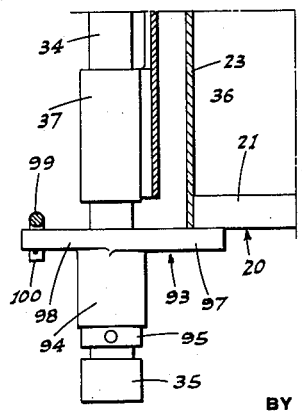
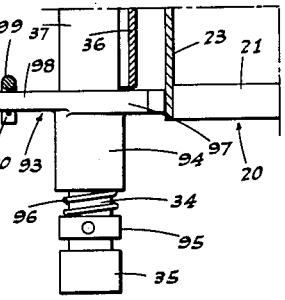
INVENTOR
G. C. Paxton
BY
ATTORNEYS United States Patent Office 2,724,833
Patented Nov. 29, 1955

2,724,833

LOCATOR AND LID CLOSING MECHANISM FOR BOX NAILING MACHINES

Gerald C. Paxton, Sanger, Calif., assignor to General Nailing Machine Corporation, Sanger, Calif., a corporation of California Application January 24, 1955, Serial No. 483,755

21 Claims. (Cl. 1—10)

This invention relates in general to improvements in a machine for closing and nailing the initially open hinged lid flaps of a box packed with produce, such as fruit or vegetables; the box being of the type which is comprised of wooden ends for nail reception, and an integral bottom, sides, and lid flaps formed of a relatively light-weight but stiff sheet of material, such as paper-board or composite paper and wood veneer in laminated relation. The term "paper-board" as used herein is deemed to embrace either type of such material, or the equivalent.

The bottom and sides of such a box are pre-nailed to the ends, and the hinging of the initially open lid flaps is accomplished by transverse scoring at the line of bend between the sides and said lid flaps.

It is a major object of the present invention to provide a novel locator and lid closing mechanism for use in an automatic box lid nailing machine; the purpose of the mechanism being to locate and square the box, particularly at the top, and to close the lid flaps while flushing the same with the box ends; all immediately in advance of—and preparatory to—the operation of such machine to nail the lid flaps to the box ends.

Another object of the instant invention is to provide, in a mechanism as above, novel means arranged to prevent outward deformation, as by bulging, of the box sides adjacent the top thereof during the lid closing and nailing operation.

A further object of the invention is to provide a mechanism, for the purpose described, which functions automatically in response to downward movement of the nailing chuck unit mounting structure of the machine.

An additional object of the invention is to provide a mechanism, for the purpose described, which—in certain embodiments of the invention—is structurally adapted for use in connection with box lid flaps which are formed to overlap at adjacent edges; the mechanism as so adapted functioning to close one lid flap in advance of the other, whereby to accomplish such overlapping preparatory to the nailing operation.

A separate object of the invention is to provide a novel releasable box stop device whose purpose is to stop, and to locate in proper position in the machine, each box as it is fed into the same for closing and nailing, in sequential order, of the initially open lid flaps of said box.

It is also an object of the invention to provide a locator and lid closing mechanism which is readily adaptable to an existing type of box mailing machine; the mechanism functioning smoothly, effectively, and positively for the intended purpose.

Still another object of the invention is to provide a practical and reliable locator and lid closing mechanism for box nailing machines, and one which will be exceedingly effective for the purpose for which it is designed.

These objects are accomplished by means of such structure and relative arrangement of parts as will fully appear by a perusal of the following specification and claims.

In the drawings:

Fig. 1 is a fragmentary, somewhat diagrammatic end elevation of, and looking forwardly into, a box nailing machine equipped with the novel locator and lid closing mechanism; a box whose lid flaps are to be closed and nailed being shown, in full lines, with said lid flaps as initially engaged with the fixed deflectors which impart a partial infolding to said lid flaps as the box advances into the machine. The view also shows, in dotted lines, the presser plates as overlying the partially infolded lid flaps upon the box being advanced to its nailing position in the machine.

Fig. 2 is a fragmentary side elevation of the box lid nailing machine embodying the present mechanism; the machine on the near side being partly broken away.

Fig. 3 is a fragmentary enlarged transverse section on line 3—3 of Fig. 2; the box being in its fully advanced or nailing position in the machine, and the lid flaps being illustrated as folded to a fully closed position by the presser plates.

Fig. 4 is a fragmentary longitudinal section on line 4—4 of Fig. 3.

Fig. 5 is a view similar to Fig. 3, but shows a modification of the presser plate and flusher shoulder assemblies; the same being shown in full lines in starting position, and in dotted lines as partially closed with the flusher shoulders in engagement with the sides of the box adjacent the top.

Fig. 6 is a fragmentary end view of one of the assemblies of Fig. 5; the latter being in fully lowered or lid-flap closing position.

Fig. 7 is a fragmentary longitudinal section on line 7—7 of Fig. 5.

Fig. 8 is a fragmentary enlarged transverse section similar to Fig. 3, but shows an attachment for use in connection with the presser plates when the same are employed for folding or closing overlapping type lid flaps; the presser plates being in a partially lowered position.

Fig. 9 is a fragmentary end elevation of the structure illustrated in Fig. 8, but shows the presser plates, and included attachment, in the positions occupied thereby when the lid flaps are fully closed.

Fig. 10 is a fragmentary enlarged transverse section, similar to Fig. 3, but shows another arrangement for use to accomplish the overlapping of adjacent edge portions of the lid flaps; the structure, including the presser plates, being shown in its fully raised or starting position.

Figure 11:
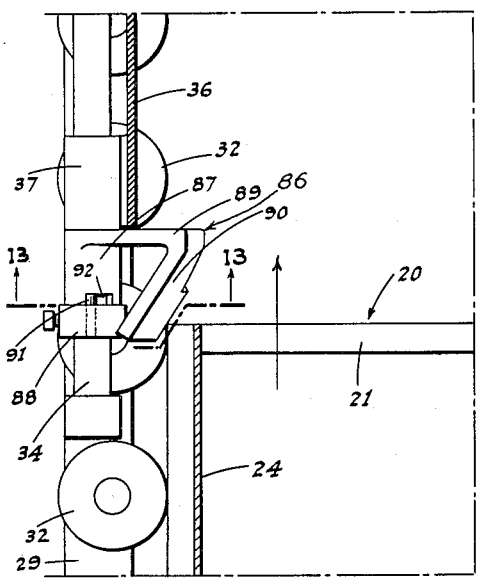

Figs. 11–19, inclusive, illustrate a novel box stop assembly; Fig. 11 being a fragmentary plan view showing one of the rearward, swingable stops in its normal position and as initially engaged by an advancing box.

Figure 12:
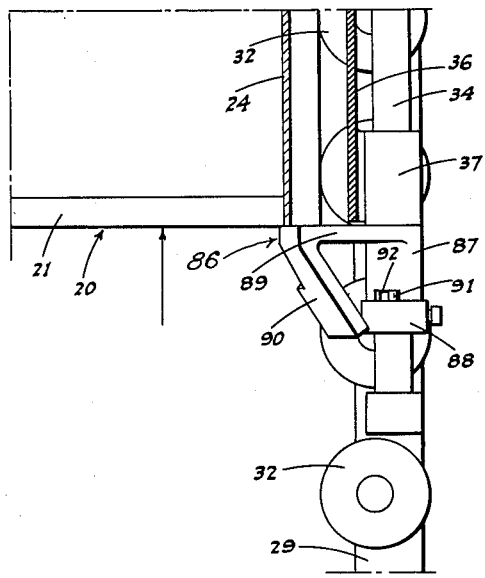

Fig. 12 is a view similar to Fig. 11, but with the box as advanced to nailing position, and showing the opposite rearward swingable stop lowered into engagement with the rear end of such box.

Figure 13:
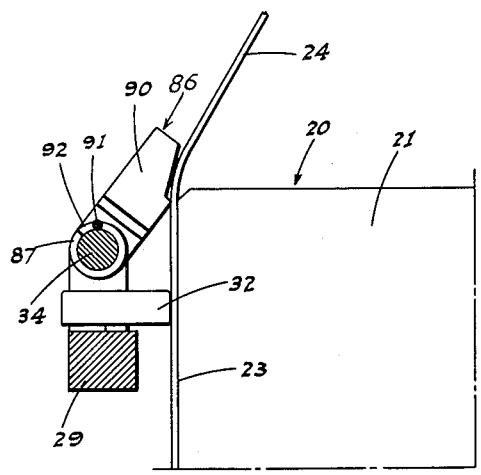

Fig. 13 is a fragmentary transverse sectional elevation on line 13—13 of Fig. 11, but shows said one rearward swingable stop as lifted out of the way by the advancing box.

Figure 14:
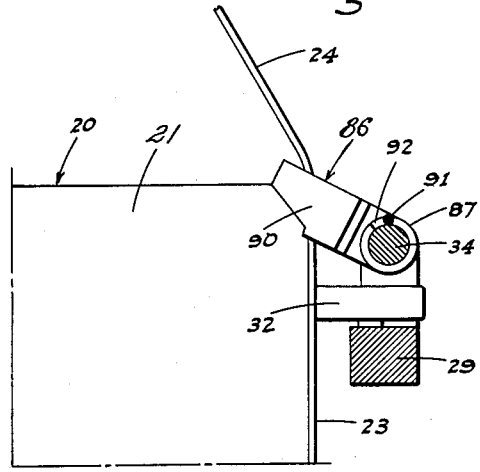

Fig. 14 is a view similar to Fig. 13, but shows the rearward swingable stop of Fig. 12 as lowered into engagement with the rear end of the box in nailing position.

Fig. 15 is a fragmentary end elevation looking rearwardly into the machine from the front, and showing one of the forward swingable stops in box engaging position. In this view the nailing chuck unit supporting frame is fully lowered and the nailing rod supporting frame is partially lowered.

Fig. 16 is a similar view, but shows the opposite forward swingable stop; the latter being shown in its raised position to permit of discharge of the box from the machine.

Fig. 17 is a fragmentary plan view, partly in section, showing one of the forward swingable stops in the position as in Fig. 15; the box being shown approaching but slightly short of such stop.

Fig. 18 is a view similar to Fig. 17, but shows the box as fully advanced and with said stop in the forwardly shifted position to which it yields.

Fig. 19 is a similar view, but shows the position assumed by such stop after it has been raised, shifts rearwardly, and lies above the adjacent longitudinal upper corner of the box.

Referring now more particularly to the drawings, and to the characters of reference marked thereon, the novel locator and lid closing mechanism is mounted in a box nailing machine of the type shown in United States Patents Nos. 2,536,416 and 2,643,377; the nailing chuck units, for the present purpose, being arranged in the machine in generally the same manner as in the latter identified patent.

This type of box nailing machine, as described in detail in the two identified United States patents, includes an upstanding main frame, indicated generally at 1. Such main frame 1 is composed of transversely spaced hollow legs 2 which upstand in rigid relation from a hollow base housing 3; the legs 2 being connected at their upper ends by a transverse top beam 4. The legs 2, base housing 3, and top beam 4 define, within the machine, a rectangular opening 5 in which is disposed a pair of heavy-duty, upstanding posts 6 in relatively widely transversely spaced relation and rigidly connected at their lower ends to the base housing 3; such posts being vertically slotted from side to side, as at 7.

Figure 1:
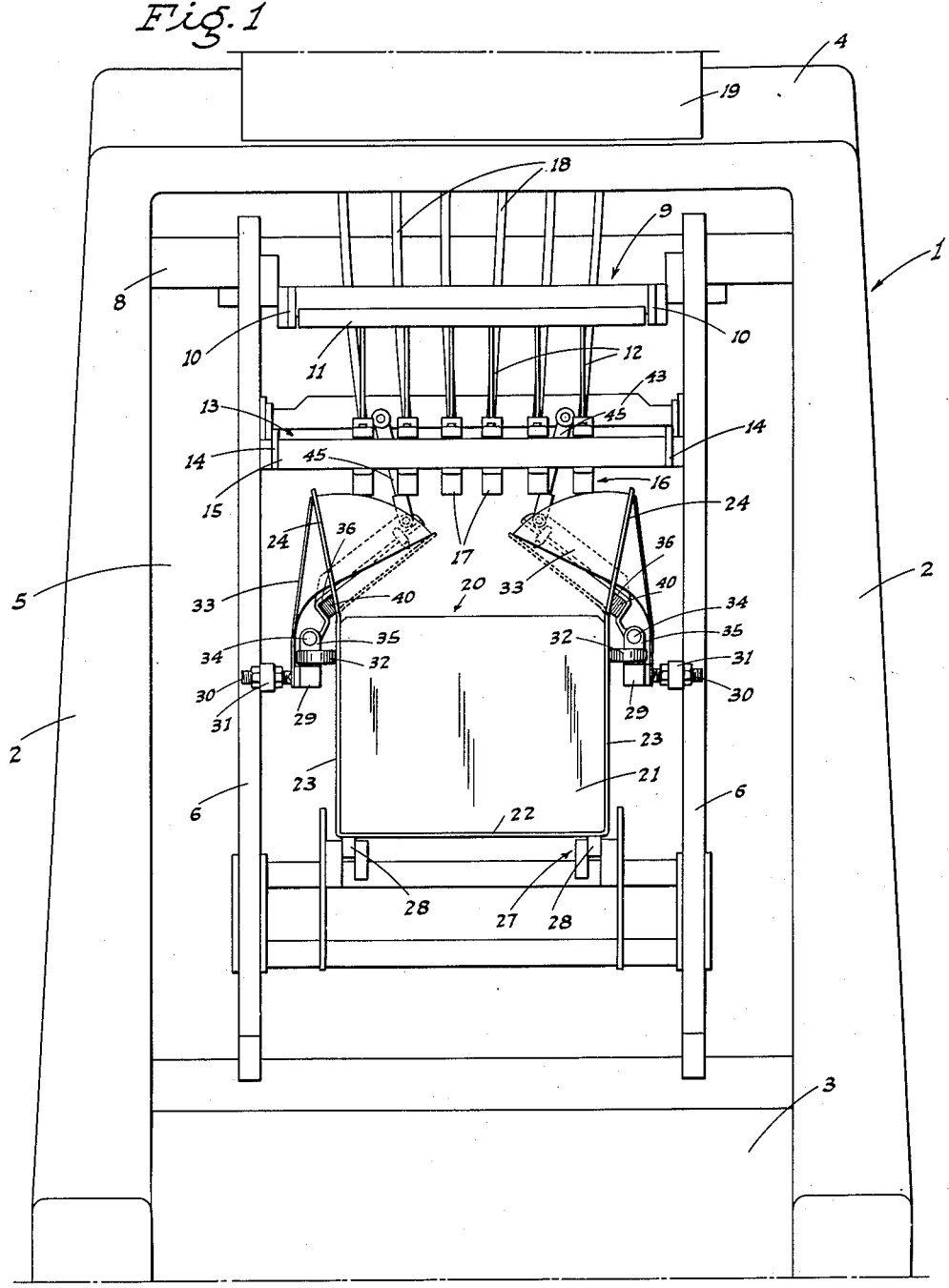

A horizontal top driving bar 8 extends transversely from leg to leg through the slots in the posts 6; such top driving bar being initially in a raised position, as in Fig. 1, but being adapted to be driven through a cycle which includes a down-stroke followed by an up-stroke, by means of connecting rods and motor driven cranks located within the hollow legs 2 in the manner contemplated by said identified patents.

A horizontal, nailing rod supporting frame—rectangular in plan—indicated generally at 9, is disposed between the posts 6 immediately below, but secured to the top driving bar 8; such nailing rod supporting frame 9 including longitudinal side bars 10 connected by transverse end bars 11. The end bars 11, which are spaced lengthwise of the machine the same distance as the length of the box whose lids are to be nailed closed, each carry a transverse row of depending nailing rods 12.

A horizontal, nailing chuck unit supporting frame, indicated generally at 13 and likewise rectangular in plan, is disposed in spaced relation below the nailing rod supporting frame 9. The nailing chuck unit supporting frame 13 includes longitudinal side bars 14 connected by transverse end bars 15; each of said end bars supporting a transversely extending nailing chuck unit, indicated generally at 16, and each of which units embodies nailing chucks 17 clamped to the related end bar 15 and having the corresponding nailing rod 12 projecting thereinto.

Suitable instrumentalities, such as in United States Patent No. 2,643,377, interconnect the nailing rod supporting frame 9 and the nailing chuck unit supporting frame 13 in a manner such that upon the downward stroke of the top driving bar 8 said frames 9 and 13 first move downwardly in unison, with the spacing therebetween remaining the same, but upon the nailing chucks engaging and coming to rest on the box, which stops movement of the frame 13, the frame 9 continues downward movement to drive the nailing rods 12 through said nailing chucks 17 to accomplish a nailing operation. Nails are fed to the chucks 17 through flexible tubes 18 which extend downwardly from a power actuated nail stripper 19 mounted on the transverse top beam 4.

Each produce packed box, indicated generally at 20, comprises upstanding wooden ends 21, and a bottom 22, sides 23, and initially open lid flaps 24; the bottom, sides, and lid flaps being formed from a single length of relatively stiff sheet material of paperboard or the like.

The lid flaps 24 are hinged in connection with the sides 23, for downward folding from an initially open to a closed position, by scoring along the hinge line 25.

Each produce packed box, with initially open lid flaps 24, is fed endwise toward the box nailing machine by means of a horizontal, longitudinally extending conveyor, represented generally at 26 in Fig. 2, and which may be of any suitable type. From the conveyor 26 each box 20 delivers onto another horizontal conveyor, indicated generally at 27, which is formed in connection with—and extends longitudinally through—the machine in a predetermined plane a substantial distance below the nailing chuck units 16.

The conveyors 26 and 27 are preferably power actuated, and the latter may be generally of chain type, as shown—for example—in United States Patent No. 2,536,416.

After each box 20 is carried by the conveyor 27 to a predetermined position within the machine, such box is brought to a stop, on supporting anvils 28, by releasable stop means such as shown in said United States Patent No. 2,636,416, or by the improved stop assembly as shown in Figs. 11–19 of the instant application, hereinafter to be described in detail. In either event the conveyor 27, after the box is stopped in nailing position above said anvils and by the releasable stop means, merely slips or skids under the box. After the lid nailing operation is completed and the stop means are released, the conveyor then carries the box out of the machine.

Except for the novel stop assembly mentioned in the preceding paragraph, the nailing machine constructed as hereinbefore described is generally conventional, and to such machine I attach a novel locator and lid closing mechanism comprising the following:

A pair of transversely spaced, horizontal rails 29 extend through the machine adjacent but inwardly of corresponding posts 6; such rails being disposed in a plane somewhat below the top of a box 20 supported in nailing position on the anvils 28. The rails 29 are rigidly secured to the related posts 6 by stand-off bolts 30 attached to mounting plates 31 vertically adjustably fastened to said posts, as shown.

The rails 29 are elongated to an extent such that they overhang the conveyor 26 and each such rail is fitted on top, and for substantially its full length, with a row of vertical axis rollers 32. The rollers 32 are of a diameter and mounted so that they project laterally inwardly from the vertical plane of the longitudinal rails 29. As a box 20 advances from the conveyor 26 such box is engaged on opposite sides by the rows of rollers; the latter maintaining such engagement when the box reaches its nailing position in the machine. When the box is in such position the rollers 32 which bear against opposite sides of the box adjacent but below the top thereof, serve to prevent any outward deformation or bulging of the box sides when the nailing operation is conducted.

As the box 20 transfers from the conveyor 26 to the conveyor 27 the upstanding lid flaps are engaged between deflectors 33 fixed to, and projecting upwardly from, the rails 29 adjacent but short of the nailing machine; such deflectors at the upper portion, and in the direction of advance, being progressively curved inwardly, as shown.

As the box 20 passes between the deflectors 33 the same act in engagement with the lid flaps 24 to impart an initial infolding to said lid flaps; i. e., the same are folded down so that they assume an upward and inward incline, as shown in dotted lines in Fig. 1.

Longitudinal shafts 34 extend horizontally through the machine above, and in parallelism to, the rails 29; the shafts being secured in connection with said rails by upstanding ears 35.

Longitudinally extending crown or presser plates 36, corresponding to the lid flaps 24, extend—normally— laterally inwardly from corresponding shafts 34 at an upward and inward incline, and such presser plates are pivoted or hinged, as at 37, to the shafts 34 for downward swinging motion from said normal inclined position.

The presser plates 36, in the portions thereof adjacent the shafts 34, are of exactly the same length as each box 20 and aline lengthwise with said box when it is in nailing position in the machine. Such portions of the presser plates 36 are formed with longitudinal, downturned flusher shoulders 38 bent at a right angle to the remaining outer portions of said plates; the presser plates at the ends thereof being notched, as at 39, from their free edges to a point adjacent but short of the flusher shoulders 38.

The purpose of the notches 39 is to permit the nailing chucks 17 to bear directly, and without obstruction, on the ends of the lid flaps 24 after the latter are fully closed by down-swinging of the presser plates, as will hereinafter appear.

The presser plates 36 are each fitted at the ends, and immediately adjacent the down-turned flusher shoulders 38, with rigidly attached depending camming ears 40 which flare slightly in a downward and longitudinally outward direction. See Fig. 4.

Additionally, the presser plates 36 each carry, adjacent their outer corners and on top thereof, relatively short, longitudinally outwardly projecting fingers 41 formed at their free ends with depending flusher pins 42. The flusher pins 42 on each presser plate 36 are longitudinally spaced exactly the same length as a box 20 in nailing position in the machine.

A cross bar 43 is fixed on top of the nailing chuck unit supporting frame 13 centrally between the end bars 15, and below such cross bar 43 the presser plates 36 are fitted—intermediate their ends and on top—with transverse upstanding reinforcing webs 44 which extend to substantially the free or outer edges of said plates.

A pair of transversely spaced thrust links 45 are pivoted at their upper ends, as at 46, to the cross bar 43 and thence extend downwardly in converging relation to pivotal connection, as at 47, with the adjacent end portions of the webs 44.

When the nailing chuck unit supporting frame 13 is in its raised position the presser plates 36 are disposed at a laterally upward and inward incline, as shown in dotted lines in Figs. 1 and 3.

As each produce packed box enters the machine and comes to rest in nailing position, the top lid flaps 24, as partially closed or infolded by the deflectors 33, assume a position beneath the presser plates 36 in substantially endwise alinement therewith.

Thereafter, with the timed and ensuing down-stroke of the nailing chuck unit supporting frame 13, the thrust links 45 swing the presser plates 36 downwardly, closing the lid flaps 24 against the box ends 21; the nailing chuck units 16 substantially simultaneously coming to rest on the end portions of said lid flaps directly above the box ends 21—i. e. the nailing chucks 17 rest on the lid flaps in the notched or cutaway portions 39 of said presser plates 36.

As the presser plates 36 swing from their raised or open to their lowered or lid flap closing position the flusher shoulders 38 abut the sides of the box immediately adjacent the top to prevent, in combination with the rollers 32, any side bulging, and at the same time the flusher pins 42, which—on each presser plate—are spaced exactly the same length as the box, project downwardly beyond the box ends to effectively flush the lid flaps 24 lengthwise of the box.

Additionally, as the presser plates 36 swing to closed position, the outwardly and downwardly inclined camming ears 40 engage the four corners of the box and accurately square it in plan; i. e. correct any slight horizontal racking that may exist in the top of the produce packed box at the time it comes to rest in nailing position in the machine.

Thus, the rollers 32, flusher shoulders 38, camming ears 40, and flusher pins 42 all assure that when the lid flaps 24 are closed, they are disposed in correct position for nailing.

When the frame 13 completes its down-stroke, and at which time the lid flaps 24 are closed, with accurate positioning thereof—as above—and the nailing chuck units 16 are in nailing position, a continuing downward motion of the frame 9 effects the nailing operation by driving the nailing rods 12 through the chucks 17.

After completion of each lid flap nailing operation, and upon the upward stroke of the frames 9 and 13, the presser plates 36 return to their raised position clear of the box, and the latter is released and discharged from the machine.

The embodiments of Figs. 5–19 inclusive will now be described, and wherein the parts common to the primary embodiment of Figs. 1–4 inclusive bear like reference numerals.

In Figs. 5–7, inclusive, there is illustrated a modified form and mounting of the presser plate and flusher shoulder assemblies; this modification comprising the following:

The rails 48 are here supported from the posts 6 by means of longitudinally spaced, upstanding attachment blocks 49 rigidly connected to the mounting plates 50 by stand-off bosses 51. Upstanding swing links 52 are pivoted at their lower ends, as at 53, to the attachment blocks 49. The swing links 52 corresponding to each rail 48 project at their upper ends through slots S into a tubular longitudinal shaft 54 which spans between, and extends beyond, such links. The links 52 are each connected to the related shaft 54—and within the same— by a friction coupling, indicated generally at 55. These friction couplings yieldably resist rotation of each shaft 54 relative to the corresponding swing links 52.

In this embodiment the presser plates are indicated at 56, and at their inner edges are formed with preferably full length, depending flusher shoulders 57 which are of half-circle, laterally outwardly concave configuration in cross section; such flusher shoulders 57 embracing, and being secured to, the related shaft 54.

Each swing link 52 is fitted with a laterally projecting limit pin 58 which projects into a recess 59 in the adjacent attachment block 49. When the swing links 52 are in a substantially upright position the limit pins 58 have reached a stop position in a laterally outward direction.

Other than modified as above, the locator and lid closing mechanism remains much the same as in the previous embodiment, including the cross bar 43 on the nailing chuck unit supporting frame 13, and which cross bar 43 is connected—in actuating relation—to the presser plates 56 by pivotally mounted links 45.

In this embodiment the swing links 52 start in a substantially upright position, with the presser plates 56 extending from the shafts 54 at a laterally inward and upward incline, as in full lines in Fig. 5.

As the nailing chuck unit supporting frame 13 beginning its down-stroke, with attendant thrust of the links 45 on the presser plates 56, the first result—due to the inclusion of the friction couplings 55—is that the links 52 move laterally inward until the flusher shoulders 57 engage the box sides 23 immediately adjacent the top, as shown in dotted lines in said Fig. 5; the purpose— as before—being to prevent bulging of the box sides during the lid flushing and nailing operation.

With continuance of the down-stroke of the nailing chuck unit supporting frame 13 the links 35 thrust the presser plates 56, and the lid flaps 24 thereunder, downwardly until said flaps come to rest on the box ends 21, in the manner shown in Fig. 6. Such motion of the presser plates 56 is accomplished with the flusher shoulders 57 remaining in engagement with the box sides 23; this for the reason that the frictional couplings 55 yield as said presser plates 56 move downwardly.

After the nailing operation is completed, and upon the up-stroke of the nailing chuck unit supporting frame 13, the links 52 first move into an erect position and until the pins 58 reach the limit of their motion in the recesses 59.

Thereafter, the friction couplings 55 again yield as the presser plates 56 continue their upward movement and return to raised or starting position.

In this embodiment the flusher pins 42 serve the same purpose as before, although they are here shown as mounted immediately at the outer edge of the presser plates.

In Fig. 8 the locator and lid flap closing mechanism is much the same as in the embodiment of Figs. 1-4 inclusive, but includes an attachment which is used when the box has lid flaps which overlap at the adjacent edge portions when closed for nailing.

In this embodiment the presser plate 61 carries on top, and between each end thereof and the web 44, a flat, relatively wide, spring-resisted but upwardly yieldable arm 62 which normally rests atop said presser plate 61 transversely thereof. While two such arms, with associated parts, may be employed, a description of one, and its function, will here suffice.

The arm 62 has a slight end projection, as at 63 beyond the inner or free edge of said plate 61. Intermediate its ends the arm 62 is formed with a vertical bore 64, and a stud 65 is fixed to plate 61 and projects upwardly therefrom—in right angle relationship—through the bore 64, terminating a distance thereabove.

A unit 66 is threaded on the upper end of the stud 65, and a compression spring 67 surrounds the stud 65 between the top of arm 62 and said nut 66. With this arrangement the arm 62 normally lies flat atop the presser plate 61, but is upwardly yieldable against the resistance of the spring 67.

The projecting end 63 of arm 62 is formed with an integral, downwardly offset, lid flap depresser shoe 68 of L-shape in side elevation, and an integral cam finger 69 extends at a laterally upward and outward incline from the outer end of said shoe 68.

The other presser plate is indicated at 70, and the latter—at its outer portion—is slightly upwardly offset, as at 71.

The above described depresser shoe attachment is used when the box includes lid flaps 72 and 73 arranged so that the flap 73 will lap the adjacent edge portion of the lid flap 72 when said flaps are in fully closed position, as shown in Fig. 9. Such depresser shoe attachment 68 functions in the following manner:

Upon the down-stroke of the nailing chuck unit supporting frame 13 such motion is imparted—as before—by the thrust links 45 to the presser plates 61 and 70; the same engaging the lid flaps 72 and 73 for the purpose of down-folding or closing the same. Upon initial engagement of the presser plate 61 with the lid flap 72, the depresser shoe 68 engages the outer edge portion of said lid flap 72 and bends it down considerably relative to the corresponding portion of the lid flap 73, so that said edge portion has a lead relative to flap 73, as shown in Fig. 8.

With continued downward motion of the presser plates 61 and 70, the outer edge portion of the lid flap 72—being down-bent—engages beneath the adjacent outer edge portion of the lid flap 73; the result being that when the presser plates 61 and 70 reach the limit of their downward movement, the lid flaps 72 and 73 are closed in overlapping relation. See Fig. 9.

As the presser plates approach their limit of downward movement, the cam finger 69 engages and rides relatively upwardly on the adjacent edge of the presser plate 70, whereby the depresser shoe 68 is swung upwardly to a position resting on plate 70, and so that the shoe does not obstruct the final downward motion of said press plates 61 and 70.

The purpose of the slight upward offset 71 in the presser plate 70 is to compensate for the double thickness of the lid flaps 72 and 73 where they overlap when closed.

In Fig. 10 there is illustrated another arrangement for use to accomplish the lapping of adjacent edge portions of the lid flaps when the same are closed.

Here the presser plates, identified at 74 and 75, are just the same as in Figs. 1-4 inclusive, except that the presser plate 75—at its outer edge portion—is slightly upwardly offset, as at 76, for the same reason as the offset 71 in the structure illustrated in Fig. 8.

The thrust link 45 for the presser plate 75 remains as before, while the thrust link—indicated generally at 77—for the presser plate 74 is of special construction, which permits of spring-resisted reduction in the effective length thereof.

The thrust link 77 comprises pivot supporting members 78 and 79; the former including an integral, upwardly extending axial rod 80 which slidably engages in an axial bore 81 in a depending boss 82 formed with the member 79. A compression spring 83 surrounds the rod 80 between the member 78 and the boss 82, and normally holds the link 77 extended.

The thrust links 45 and 77 converge in a downward direction, as before, but the thrust link 77 is somewhat longer than the link 45 when the spring 83 is extended. By reason of this arrangement the thrust link 77, upon the down-stroke of the nailing chuck unit supporting frame 13, swings the presser plate 74 and the engaged lid flap 84 downwardly in somewhat leading relation to the presser plate 75 and the lid flap 85 engaged thereby. As a consequence the outer edge portion of the lid flap 84 is engaged beneath the corresponding portion of the lid flap 85 as said flaps are folded downwardly, and to the end that when in closed position the adjacent edge portions thereof are in lapping relationship, as shown in dotted lines in Fig. 10.

By reason of the lead imparted to the presser plate 74 and lid flap 84 it is necessary that the thrust link 77 be capable of reduction in its effective length, as the motion of such thrust link 77 stops before the thrust link 45 reaches its downward limit of travel. This reduction in effective length is obtained by the sliding of rod 80 into bore 81, and the accompanying compression of spring 83 as the bar 43 descends to its limit of movement after flap 84 has flatly engaged the top of the box.

In Figs. 11-19, inclusive, there is disclosed a novel box stop assembly whose purpose is to stop the box in a predetermined nailing position in the machine and to simultaneously square the box at the top before closing of the lid flaps by the presser plate arrangement; the camming ears 40, as in Figs. 1-4 for example, being unnecessary and are omitted when the box stop assembly of Figs. 11-19 is used. Additionally, such assembly avoids the need of any separate releasable box stops such as shown at 69 in Patent No. 2,536,416.

The box stop assembly includes, as shown in Figs. 11-14 inclusive, a rear swingable stop 86 mounted on each shaft 34 adjacent but short of the rear ends thereof. Each rear swingable stop 86 comprises a sleeve 87 turnable on the related shaft between the adjacent hinge sleeve 37 of the corresponding presser plate 36, and a collar 88 on said shaft rearwardly of the sleeve 87. A laterally inwardly projecting, upwardly inclined stop element 89 is formed integral with the sleeve 87, and a rearwardly extending diagonal cam finger 90 runs internally from the outer end of the stop element 89.

The above described stop 86 is prevented from lowering below a predetermined position by a longitudinal pin 91 which projects from the collar 89 into a limiting slot 92 in the adjacent end of said sleeve 87. Such slot is arranged to permit of limited upward swinging motion of the stop 86.

As each box 20, with its partially infolded lid flaps 24, advances into the machine, such box—at its upper corners—engages the cam fingers 90 of the stops 86, swinging them upwardly from the position of Fig. 11 to the position of Fig. 13 so that said stops 86 ride the longitudinal upper corners of the box as it moves into the machine to nailing position. As the box 20 reaches nailing position the stops 86 drop behind the upper corners of the rear of said box in the manner shown in Fig. 14; effectively preventing any retraction of said box from its nailing position.

When the box so advances to nailing position, it is also engaged at the upper corners at the front by the following forward stop arrangement; the latter being shown in Figs. 15-19 inclusive. Such forward stop arrangement comprises a pair of laterally inwardly projecting, upwardly inclined forward swingable stops, each being indicated generally at 93.

Each forward swingable stop 93 comprises a sleeve 94 turnable on the related shaft 34 between the hinge sleeve 37 of the corresponding presser plate 36, and a collar 95 fixed on said shaft normally a slight distance ahead of the forward end of said sleeve 94. A compression spring 96 surrounds the shaft 34 between the collar 95 and the sleeve 94; such spring seating in a socket in said sleeve.

A stop element 97 is formed integral with, and projects laterally inwardly at an upward incline from, the sleeve 94. A radial lever arm 98 is formed integral with, and projects laterally outwardly from, the sleeve 94 generally in opposition to the stop element 97.

A perpendicular rod 99 upstands from the outer end of each lever arm 98; being pivotally connected to the latter, as at 100. Intermediate its ends the rod 99 runs through a guide 101 fixed on the corresponding end of the nailing rod supporting frame 9, and a collar 102 is fixed on the rod at a predetermined point intermediate the lever arm 98 and the guide 101.

A compression spring 103 is secured to a head 104 on the upper end of each rod 99 and depends in surrounding relation to the same. As the box 20 advances into the machine and approaches nailing position, such box—at the upper corners and at the front—engages the forward swingable stops 93—which are then in their lowered position—and advances such stops against the compression of the spring 96. When the stops 93 are advanced to their limit the box is in nailing position, and at such time the rear swingable stops 86 of Figs. 11–14 drop into their holding position against the upper corners at the rear of the box.

The box is thus confined, in its nailing position, between such rear swingable stops 86 and the forward swingable stops 93. Such assembly of stops serves not only to locate the box in proper nailing position, but also squares the box at the top preparatory to the subsequent infolding to closed position of the lid flaps 24 by the presser plates 36 in the manner described—for example—in connection with the structure shown in Figs. 1–4 inclusive, and which lid flap closing is immediately followed by the nailing operation, and wherein the nailing rod supporting frame 9 continues a certain downward motion after the nailing chuck unit supporting frame 13 reaches its downward limit of travel.

With such continued downward motion of the nailing rod supporting frame 9 the guides 101 strike the collars 102 and impart downward shifting to the rods 90, swinging the lever arms 98 downwardly, and the forward stops 93 upwardly to a box clearance position. See Fig. 16. When this occurs, the springs 96 act to shift the forward swingable stops 93 rearwardly a distance such that they then overhang the upper longitudinal corners of the box so that it may advance without obstruction.

The box, with the lid flaps nailed closed, is then advanced out of the machine, but only after the frames 9 and 13 begin their up-stroke. When such frames reach their top limit of travel the guides 101 engage and compress the springs 103, which tends to raise the rods 99 and lever arms 98, and to lower the forward swingable stops 93. However, such stops cannot lower until the box is advanced completely out of the machine, but as soon as this occurs the springs 103, acting on the rods 99 and lever arms 98, swing the stops 93 downwardly to their starting position and for engagement by the next box which enters the machine, whereupon the cycle is repeated.

The present invention, in its several embodiments, provides a positive, effective, and smooth operating mechanism—in a box lid nailing machine—for locating the box in proper nailing position; squaring the box at the top; and infolding the hinged, paperboard lid flaps in a position flush with the ends for nailing thereto of such lid flaps.

The mechanism, by reason of its described mounting, is capable of ready and convenient installation in a nailing machine of the type illustrated.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention as defined by the appended claims.

Having thus described the invention, the following is claimed as new and useful, and upon which Letters Patent are desired:

1. In a box lid nailing machine which includes an upstanding frame, a support on the frame for a box having ends, sides, and initially open hinged lid flaps, and nailing means mounted on the frame for power actuation downwardly from above a supported box and operative to engage and nail said lid flaps, when closed, to the box ends; locator and lid flap closing mechanism comprising members mounted on the frame for downward swinging movement in engagement with and to close said lid flaps, means responsive to actuation of said nailing means operative to impart such swinging movement to said members, and means associated with the members adapted, upon such downward swinging thereof, to longitudinally flush the lid flaps with the box ends.

2. In a box lid nailing machine which includes an upstanding frame, a support on the frame for a box having ends, sides, and initially open hinged lid flaps, and nailing means mounted on the frame for power actuation downwardly from above a supported box and operative to engage and nail said lid flaps, when closed, to the box ends; locator and lid flap closing mechanism comprising members mounted on the frame for downward swinging movement in engagement with and to close said lid flaps, means responsive to actuation of said nailing means operative to impart such swinging movement to said members, means associated with the members adapted, upon such downward swinging thereof, to longitudinally flush the lid flaps with the box ends, and means associated with the members adapted, upon such downward swinging thereof, to engage the box adjacent the top and at the corners to square said box in plan.

3. In a box lid nailing machine which includes an upstanding frame, a support on the frame for a box having ends, sides, and initially open hinged lid flaps, and nailing means mounted on the frame for power actuation downwardly from above a supported box and operative to engage and nail said lid flaps, when closed, to the box ends; locator and lid flap closing mechanism comprising members mounted on the frame for downward swinging movement in engagement with and to close said lid flaps, means responsive to actuation of said nailing means operative to impart such swinging movement to said members, and instrumentalities on said members adapted, upon such downward swinging thereof, to flush the lid flaps with the box ends, to square the box in plan at the top, and to prevent outward bulging of the box at the sides adjacent the top.

4. In a box lid nailing machine which includes an upstanding frame, a support on the frame for a box having ends, sides, and initially open hinged lid flaps, and nailing means mounted on the frame for power actuation downwardly from above a supported box and operative to engage and nail said lid flaps, when closed, to the box ends; locator and lid flap closing mechanism comprising presser plates longitudinally hinged in connection with the frame laterally of a supported box for inward and downward swinging motion in engagement with and to close corresponding lid flaps, means responsive to actuation of said nailing means operative to impart such swinging movement to the presser plates, flusher elements depending from the ends of the presser plates adapted to confine the lid flaps and longitudinally flush the same with the box ends, the presser plates having downturned, longitudinal flusher shoulders formed thereon in position to abut the sides of the box adjacent the top upon such downward swinging of said plates, and means carried by the presser plates adapted to substantially simultaneously square the box in plan at the top; said last named means comprising camming ears depending from the ends of the presser plates adjacent said flusher shoulders, said ears being inclined downwardly and outwardly.

5. In a box lid nailing machine which includes an upstanding frame, a support on the frame for a box having ends, sides, and initially open hinged lid flaps, and nailing means mounted on the frame for power actuation downwardly from above a supported box and operative to engage and nail said lid flaps, when closed, to the box ends; locator and lid flap closing mechanism comprising transversely spaced longitudinal members extending lengthwise of and adjacent the sides of a supported box, means mounting said longitudinal members in connection with the frame for limited laterally inward motion toward the box sides from an initial position clear thereof and for yieldably resisted part-turning about a longitudinal axis, presser plates extending laterally inwardly from said members initially at an upward incline above the lid flaps of a supported box, said presser plates including flusher shoulders depending therefrom adjacent and secured to said members, and means responsive to actuation of said nailing means operative to impart downward swinging motion to the presser plates whereby to close said lid flaps; the members, in response to the initial downward motion of the presser plates moving laterally toward the box sides until the flusher shoulders engage the same, and such members then so part-turning with continued downward motion of said presser plates to a lid flap closing position, and with the flusher shoulders remaining in box side engagement.

6. In a box lid nailing machine which includes an upstanding frame, a support on the frame for a box having ends, sides, and initially open hinged lid flaps, and nailing means mounted on the frame for power actuation downwardly from above a supported box and operative to engage and nail said lid flaps, when closed, to the box ends; locator and lid flap closing mechanism comprising presser plates disposed in an initial position above corresponding lid flaps and at a laterally inward and upward incline, means longitudinally hinging the presser plates adjacent their laterally outer edges in connection with the frame for downward swinging motion to close said lid flaps, and means responsive to actuation of said nailing means to so swing the presser plates; there being flusher shoulders depending from the presser plates initially laterally out from but for engagement with the box sides adjacent the top upon such downward swinging of the presser plates; and said hinging means including laterally swingable links and friction couplings arranged so that upon initial downward motion of the presser plates, the flusher shoulders move laterally inward into engagement with the box side and so remain as the presser plates continue said downward motion to lid flap closing position.

7. In a box lid nailing machine which includes an upstanding frame, a support on the frame for a box having ends, sides, and initially open hinged lid flaps which lap at adjacent edge portions when closed, and nailing means mounted on the frame for power actuation downward from above a supported box and operative to engage and nail said lid flaps, when closed, to the box ends; lid flap closing mechanism comprising members mounted on the frame for downward swinging movement in engagement with and to close said lid flaps, means responsive to actuation of said nailing means operative to impart such swinging movement to said members, and means associated with at least one of said members arranged to cause the engaged lid flap to lead the other at adjacent edge portions, upon such swinging movement of said members, so that said portions lap when the lid flaps are fully closed.

8. In a box lid nailing machine which includes an upstanding frame, a support on the frame for a box having ends, sides, and initially open hinged lid flaps which lap at adjacent edge portions when closed, and nailing means mounted on the frame for power actuation downward from above a supported box and operative to engage and nail said lid flaps, when closed, to the box ends; lid flap closing mechanism comprising presser plates hinged in connection with the frame for laterally inward and downward swinging motion in engagement with and to close said lid flaps of a box disposed endwise in the machine, means responsive to actuation of said nailing means operative to impart such swinging movement to said presser plates, a depresser shoe normally depending from adjacent and to below the free edge of one presser plate, and means mounting the depresser shoe on said one presser plate for resisted upward yielding; the shoe, upon such swinging movement of the presser plates, engaging and depressing the outer edge portion of the related lid flap, causing the same to lead the corresponding portion of the other lid flap whereby said portions lap when the lid flaps are fully closed by the presser plates, and said shoe then having yielded upwardly.

9. In a box lid nailing machine which includes an upstanding frame, a support on the frame for a box having ends, sides, and initially open hinged lid flaps which lap at adjacent edge portions when closed, and nailing means mounted on the frame for power actuation downward from above a supported box and operative to engage and nail said lid flaps, when closed, to the box ends; lid flap closing mechanism comprising presser plates hinged in connection with the frame for laterally inward and downward swinging motion in engagement with and to close said lid flaps of a box disposed endwise in the machine, and means responsive to actuation of said nailing means operative to impart such swinging movement to said presser plates; said last named means including transversely spaced, downwardly converging thrust links pivotally connected between the nailing means and corresponding presser plates, and one of said thrust links being disposed at a lesser angle of convergence than the other whereby to cause the presser plate and engaged lid flap corresponding to said one thrust link to lead the other presser plate and its engaged lid flap, whereby to accomplish lapping of adjacent edge portions of said lid flaps upon such downward swinging motion of said presser plates.

10. In a box lid nailing machine which includes an upstanding frame, a support on the frame for a box having a lid, box lid nailing means mounted on the frame for power actuation downwardly from above a supported box, and means for moving a box endwise onto the support and then away from the same; a box stop assembly comprising longitudinally spaced, forward and rearward stops having normal positions for engagement with the front and rear of a box on the support in nailing position, said stops when in such normal positions being disposed in the path of movement of the box, means mounting said stops for motion to positions clear of said path and for return to said normal positions, means responsive to movement of the box onto the support to cause such motion of the rearward stop, and means responsive to actuation of the nailing means to cause such motion of the forward stop.

11. A box stop assembly, as in claim 10, in which the forward stop is mounted for limited spring resisted shifting in an advancing direction, a box on the support in such nailing position having engaged and so shifted said forward stop, and the latter being operative to spring return to a position short of the front of the box upon said forward stop moving clear of said path in response to actuation of the nailing means.

12. In a box lid nailing machine which includes an upstanding frame, a support on the frame for a box having a lid, box lid nailing means mounted on the frame for power actuation downwardly from above a supported box, and means for moving a box endwise onto the support and then away from the same; a box stop assembly comprising longitudinally spaced forward and rearward stops, there being a transversely spaced pair of said forward stops and a transversely spaced pair of said rearward stops, the forward and rearward stops having normal positions for engagement with upper portions of the front and rear respectively of a box on the support in nailing position, said stops when in such normal positions being disposed in the path of movement of the box, means mounting said stops for motion to positions clear of said path and for return to said normal positions, means responsive to movement of the box onto the support to cause such motion of the rearward stops, and means responsive to actuation of the nailing means ot cause such motion of the forward stops.

13. A box stop assembly, as in claim 12, in which the rearward stops are pivotally mounted for gravitational return to said normal position, and said responsive means for the rearward stops including box engaging cam elements thereon.

14. A box stop assembly, as in claim 12, in which the forward stops are mounted for limited shifting in an advancing direction, and spring means yieldably resisting such shifting; a box on the support in such nailing position having engaged and so shifted said forward stops, and said spring means being operative to return shift the forward stops to a position short of the front end of the box upon said forward stops moving clear of said path in response to actuation of the nailing means.

15. In a box-lid fastening machine, which includes a frame, a support on the frame for a box having ends, sides, and hinged lid flaps, and fastening means operable to engage and fasten said lid flaps when the latter are closed on the box; lid-flap closing mechanism mounted on the machine and comprising hinged members to engage and close said lid flaps prior to the operation of the fastening means.

16. In a box-lid fastening machine which includes a frame, a support on the frame for a box having ends, sides, and initially open hinged lid flaps, and fastening means operable to engage and fasten said lid flaps to the ends of the box when the flaps are closed on the box; lid-flap closing mechanism mounted on the machine and including flap engaging members arranged to engage the open flaps and move the same to a closed position and to flatly engage substantially the entire area of the flaps when the latter are fully moved to such closed position and prior to the operation of the fastening means.

17. A structure, as in claim 15, with elements mounted on said hinged members to engage and square up the top of the box upon functioning of said members to close the flaps.

18. In a box-lid fastening machine which includes a frame, a support on the frame for a box having ends, sides, and hinged lid flaps, and fastening means operable to engage and fasten said lid flaps when the latter are closed on the box; and instrumentalities mounted on the machine to engage and close the flaps and also arranged to apply pressure laterally inward against the flaps along their line of hinging.

19. In a box-lid fastening machine which includes a frame, a support on the frame for a box having ends, sides, and hinged lid flaps, and fastening means operable to engage and fasten said lid flaps when the latter are closed on the box; lid-flap closing mechanism mounted on the machine and including members to engage and close said flaps prior to the operation of the fastening means, and means on said members to engage the edges of the lid flaps to position them in proper alinement with the ends of the box for fastening thereto.

20. In a box-lid fastening machine which includes a frame, a support on the frame for a box having ends, sides, and hinged lid flaps, and fastening means operable to engage and fasten said lid flaps when the latter are closed on the box; said fastening means including a cross bar having nail chucks depending therefrom for engagement with the flaps when the latter are closed; flap engaging members hinged on the machine on opposite sides of the box, and connections between the cross bar and members to swing the latter down simultaneously with the lowering of the chucks so that the latter will engage the flaps when said flaps engage the top of the box.

21. In a box-lid fastening machine which includes a frame, a support on the frame for a box having ends, sides, and hinged lid flaps arranged to overlap when closed on the box, and fastening means operable to engage and fasten said lid flaps when the latter are closed on the box; said fastening means including a cross bar having nail chucks depending therefrom for engagement with the flaps when the latter are closed; flap engaging members hinged on the machine on opposite sides of the box, and links connecting the cross bar and members to swing the latter down simultaneously with the lowering of the chucks so that the latter will engage the flaps when said flaps engage the top of the box; one link being longer than the other to give a lead to the corresponding member and the flap engaged thereby and being contractible so as to allow of continued downward movement of the cross bar and the other member and flap after said corresponding flap has engaged the box.

References Cited in the file of this patent

UNITED STATES PATENTS

| | | |
|---|---|---|
| 2,121,820 | Paxton | June 28, 1938 |
| 2,569,355 | Tubbs | Sept. 25, 1951 |